United States Patent Office 2,956,992
Patented Oct. 18, 1960

2,956,992

PROCESS FOR THE POLYMERIZATION OF OLEFINS WITH CATALYSTS OF CERTAIN ALKYL ALUMINUM ETHERATES AND GROUP IV-B METAL TETRACHLORIDES

Gerhard Geiseler, Leuna, and Wolfgang Knothe, Merseburg, Germany, assignors to VEB Leuna-Werke "Walter Ulbricht," Leuna, Kreis Merseburg, Germany No Drawing. Filed May 8, 1958, Ser. No. 733,813

Claims priority, application Germany May 15, 1957

9 Claims. (Cl. 260—93.7)

This invention relates to polymerization processes and more particularly to a polymerization process for the polymerization of olefins.

It is known in the polymerization art that olefins, and in particular α-olefins, may be polymerized in the presence of metal alkyl compounds and heavy-metal compounds to yield high molecular synthetic, plastic-like products. Ethylene, for example, may in the presence of triethyl aluminum and titanium tetrachloride be polymerized to high-molecular plastic compounds of average molecular weights of up to 2,000,000. The trialkyl aluminum compounds are particularly active catalysts for the purpose under consideration. Trialkyl aluminum compounds may be obtained by reacting halogen substituted alkyl aluminum compounds (alkyl halide aluminum) with sodium and sodium hydride or with sodium fluoride. It is, however, also feasible to prepare trialkyl aluminum compounds directly without having to resort to the conversion of intermediate compounds. Such a direct preparation is accomplished by causing olefins and hydrogen to act on aluminum. This procedure, however, generally requires elevated temperatures and high pressure.

It has also been suggested to employ the trialkyl aluminum etherates of ethyl ether as catalysts in the polymerization of olefins. Such trialkyl aluminum etherates can be prepared in a relatively simple manner. However, if these etherates are employed as catalysts in the polymerization of olefins, no polymerizates having the properties and characteristics of commercial plastics, but relatively low-molecular compounds of little utility are obtained.

Unsuccessful experiments have also been conducted to use these etherates as catalysts in the presence of heavy-metal compounds. The reason for the failure of these experiments seems to reside in the fact that these etherates, due to their stability, apparently are not capable of reducing the heavy-metal compounds to the required low valence value at which they are active. Consequently, no processes are described in the literature which teach the polymerization of olefins in the presence of trialkyl aluminum etherates and heavy-metal compounds.

It is an object of the present invention to provide a process for the polymerization of olefins, wherein certain trialkyl aluminum etherates or alkyl aluminum halide etherates may successfully be used as catalysts in conjunction with heavy-metal compounds.

It has been ascertained by us that olefins, and in particular α-olefins, may be successfully polymerized to yield high-molecular compounds in the presence of trialkyl aluminum etherates, if the polymerization is carried out in the presence of certain suitable heavy-metal compounds and the trialkyl aluminum etherates of alkyl aryl ethers are used.

We have also established that the trialkyl aluminum moiety may successfully be replaced by alkyl aluminum halide so that the polymerization is carried out in the presence of alkyl aluminum halide etherates of alkyl aryl ethers.

We have furthermore found that the polymerization of the olefins proceeds very successfully if a mixture of trialkyl aluminum etherates of alkyl aryl ethers and alkyl aluminum halide etherates of alkylaryl ethers is used, the mixing ratio having no influence on the course of the polymerization.

The term "heavy-metal compounds" as used in this application is deemed to refer to compounds of the metals of group 4B, 5B and 6B of the periodic system. Particularly suitable are the compounds of titanium, zirconium, vanadium and molybdenum.

The anisole and phenetole etherates of trialkyl aluminum and alkyl aluminum halide have been found to be particularly suitable for the inventive purpose.

It is also emphasized that mixtures of olefins may be polymerized by the inventive process.

The etherates to be used in accordance with this invention are excellent polymerization accelerators which in respect to their catalytic efficiency and activity compare favorably with the trialkyl aluminum compounds proper. They are to be preferred over the trialkyl aluminum compound proper since the preparation of the inventive etherates can be effected in a quicker and technically simpler manner than that of the trialkyl aluminum compounds which require considerable expenditure with regard to time and apparatus.

A further advantage of the etherates of the invention over the highly inflammable prior art compounds resides in the fact that they do not ignite spontaneously, whereby their handling is considerably simplified.

The polymerization may be carried out in the presence or absence of solvents, depending on the circumstances. In many instances it may be advantageous to use as a solvent the very ether that is used for the preparation of the respective etherate. The ether-solvent may of course be recovered upon completion of the polymerization and subsequent working-up of the polymerizate. The recovery of the ether may be effected by known methods with small losses and may be recycled to the inventive polymerization process.

The polymerization is preferably carried out at a temperature ranging between 0 and 200° C., depending on the circumstances. A preferred temperature range is between 20 and 100° C.

In many instances the reaction velocity is so great that the polymerization proceeds at normal pressure. However, it is certainly feasible to effect the polymerization under pressure. The particular pressure to be chosen depends on the concentration of the olefin or the olefin mixture and the composition of the etherate and the heavy-metal compound. Generally speaking, pressure values of up to 500 atmospheres and above may be applied.

The inventive process will now be described by several examples, it being understood, however, that these examples are given by way of illustration and not by way of limitation and that many changes and alterations may be made in the choice of temperatures, concentrations etc. and in the process conditions in general, without departing from the scope and spirit of this invention as expressed in the appended claims.

*Example 1*

3.5 liters of an anhydrous light benzine (low-boiling gasoline fraction), 8 grams of triethyl aluminum anisole etherate (the anisole etherate of triethyl aluminum) and 5 grams of titanium tetrachloride were placed in a glass flask fitted with a stirrer. Ethylene was introduced into the flask. The temperature of the mixture thus obtained rose to about 70–75° C. and the mixture assumed a black-brown color. The supply of ethylene was adjusted in such a manner, that the temperature did not rise any further. The reaction was interrupted after about 6 hours in spite of the fact that the mixture was still capable of taking up more ethylene. The suspension thus obtained was then transferred to a suction filter, the solvent was separated and the solid residue was thoroughly washed with methyl alcohol, whereby a completely colorless polymerization product was obtained. Upon drying 552 grams of a snow-white polyethylene having a melting point of 130 to 135° C. were obtained. The ash content was 0.11% and the yield amounted to about 95% calculated on the amount of ethylene employed.

*Example 2*

6 grams of tributyl aluminum anisole etherate and 5 grams of titanium tetrachloride are introduced into 2 liters of an anhydrous, light benzine under the same conditions as described in connection with Example 1. Ethylene is immediately introduced into the mixture at normal pressure. The reaction proceeded extremely vigorously and the ethylene was taken up practically quantitatively. The reaction temperature was maintained at about 60 to 70° C. After about 3 hours the reaction, which at that point was still very lively, was interrupted and the reaction product was worked up in the manner described in Example 1. 450 grams of a pure, white ethylene polymerization product having a melting point of 133–138° C. and an ash content of 0.10% were obtained. The yield, calculated on the ethylene used, amounted to about 92%.

*Example 3*

12 grams of triethyl aluminum phenetole etherate and 3 grams of titanium tetrachloride were introduced into 2 liters of an anhydrous light benzine in the manner previously described. Ethylene was introduced at normal pressure. The reaction temperature was maintained at about 70–75° C. The reaction which was still lively after 4 hours was then interrupted and the reaction product was worked up. 360 grams of pure white polyethylene having a melting point of 126 to 138° C. and an ash content of 0.08% were obtained. The yield, calculated on the amount of ethylene used, amounted to 94%.

*Example 4*

Ethylene was forced at a pressure of 6 atmospheres into an autoclave made from high-grade steel. The autoclave was fitted with a stirrer, had an interior capacity of 2 liters and contained the same ingredients as described in the previous example. The reaction conditions generally were the same as in the previous example with the exception of the pressure. The reaction proceeded extremely vigorously at a temperature of 60° C. The polymerization was interrupted after 3 hours and the reaction product was worked up. 420 grams of polyethylene were obtained in the form of a white powder. The melting point was 129 to 135° C., the ash content was 0.10% and the yield, calculated of the ethylene employed, amounted to 90%.

*Example 5*

10 grams of triethyl aluminum anisole etherate and 6 grams of zirconium tetrachloride were introduced with stirring into 300 cubic centimeters of anhydrous synthetic light benzine obtained by a hydrogenation process. After a short period of stirring, the mixture thus obtained was transferred into an autoclave fitted with stirrer, containing 1 liter of the same solvent and having an interior volume of 4 liters. The air in the autoclave had previously been expelled by sweeping with propylene. 500 grams of propylene were thereafter forced into the autoclave and the temperature was increased to 60 to 70° C., resulting in a maximum pressure of 25 atmospheres. The polymerization was interrupted after 48 hours. At the time of the interruption the pressure gauge indicated a pressure of 15 atmospheres. Upon cooling of the autoclave and release of excess pressure of the reaction mixture, a dark colored paste or slurry of solid polypropylene was obtained. This slurry, upon filtration of the solvent and washing with methyl alcohol and water exhibited a white appearance. The dried product consisted of about 300 grams of pure polypropylene having a melting point of 153 to 158° C.

*Example 6*

The polymerization was carried out in an autoclave fitted with stirrer. The autoclave had an interior volume of 5 liters and was made from corrosion resistant steel. 11 grams of tributyl aluminum anisole etherate, 6 grams of titanium tetrachloride and 1 liter of anhydrous light benzine obtained by a hydrogenation process were introduced into the autoclave, 300 grams of propylene were thereafter forced into the autoclave. The reaction proceeded very quickly at a temperature of 65–75° C. The temperature rose for some time to 90° C. but decreased thereafter slowly to the indicated value. The autoclave was opened after 5 hours and the solid propylene polymerization product—which had a brown color—was then worked up and dried as described in connection with Example 5.

A purer product was obtained by subjecting the crude product thus obtained thereafter to a treatment with hydrochloric acid at elevated temperature, extracting the product with ether and precipitating with a relatively large quantity of methyl alcohol. 221 grams of white polypropylene exhibiting a melting point of 158° C. were obtained.

*Example 7*

A mixture of 20 grams of tributyl aluminum anisole etherate and 8.5 grams of titanium tetrachloride was prepared as described in the preceding examples. The mixture was diluted with 300 cubic centimeters of anhydrous hydrogenation benzine and introduced into an autoclave having an interior volume of 1 liter. 200 grams of α-butylene were introduced. Upon heating and stirring of the reaction mass, the reaction started spontaneously. The reaction temperature was maintained at 80–90° C. The reaction time was about 8 hours. Upon further processing of the polymerization product in the previously indicated manner, 58 grams of a pure, white polybutylene exhibiting a melting point of 115–120° C. were obtained.

*Example 8*

The polymerization was carried out in a three-necked flask having an interior volume of 2 liters and being fitted with stirrer, thermometer, dropping funnel and reflux cooler. A solution of 65 grams of α-hexene in 100 grams of anhydrous hexane was introduced into the flask. 20 grams of triethyl aluminum anisole ethereate and 4.5 grams of titanium tetrachloride were successively added to the solution. The reaction mixture thus obtained was heated to its boiling point and maintained at the boiling temperature for 6 to 8 hours. Upon treatment with hydrochloric acid and methanol, the mixture was concentrated by evaporation to dryness. A polymerization product was thus obtained in a yield of 60%, calculated on the α-hexene used.

*Example 9*

The polymerization was carried out in a 1 liter, three-necked flask fitted with stirrer, thermometer and 2 ground stopcocks. 350 cubic centimeters of heavy benzine, 1.5 grams of diethyl aluminum monochloride phenetole etherate and 0.3 grams of titanium tetrachloride were placed into the flask while introducing ethylene. The mixture thus obtained assumed immediately a black-brown color and ethylene started to separate in the form of a colorless polymerization product. In doing so, the temperature rose rapidly to 50° C. After about 3.5 hours the reaction was interrupted although the reaction mixture was still capable of absorbing large amounts of ethylene. The suspension thus obtained was then transferred to a suction filter and the residue was washed with methyl alcohol. Upon drying 25 grams of white, pure polyethylene were obtained. The yield, calculated on ethylene was about 95%. Melting point: 130 to 135° C.

*Example 10*

The polymerization was carried out in a flask as described in Example 9. 2 grams of dibutyl aluminum monobromide anisole etherate and 1 gram of titanium tetrachloride were added to 0.5 liter of anhydrous heavy benzine. The reaction conditions were generally the same as in the preceding example. Ethylene was immediately introduced into the mixture at normal pressure. The reaction was extremely vigorous and the ethylene was taken up practically quantitatively. The reaction temperature was 60° C. The reaction was interrupted after 4 hours, whereafter the reaction product was further processed in the manner described in Example 9. 90 grams of pure white polyethylene having a melting point of 130–138° C. were obtained.

*Example 11*

The polymerization was carried out in a high-grade steel autoclave fitted with stirrer and having an interior volume of 2 liters. 100 cubic centimeters of anhydrous benzine obtained by hydrogenation, 5 grams of diethyl aluminum monochloride anisole etherate and 3 grams of zirconium tetrachloride were introduced into the autoclave. After a short period of stirring, 500 cubic centimeters of the same solvent and 250 grams of propylene were introduced into the mixture. The temperature was raised to about 70° C. resulting in a pressure increase to 20 atmospheres. The polymerization was interrupted after 45 hours. Upon cooling of the autoclave and release of excess pressure, a dark slurry of solid polypropylene was obtained. This slurry was subjected to a thorough purification treatment. The product was washed with methyl alcohol and water until the polymerization product assumed a white appearance. The dried product consisted of about 120 grams of pure polypropylene of a melting point of 155° C.

*Example 12*

The polymerization was carried out in a three-necked flask of 1 liter capacity. The flask was fitted with stirrer, thermometer, gas inlet and gas outlet valves. 300 cubic centimeters of anhydrous heavy benzine, 0.8 gram of triethyl aluminum phenetole etherate, 0.6 gram of diethyl aluminum monochloride anisole etherate and 0.3 gram of titanium tetrachloride were added to the flask while ethylene was introduced. The mixture assumed immediately a dark brown color and polymerized ethylene separated in powder form, while the temperature rose rapidly to 60° C. The reaction was interrupted after a reaction period of 4 hours. The dark polymerization product obtained was thereupon further processed in the manner indicated in Examples 9–11 until a pure white product was obtained. 30 grams of a pure polyethylene of a melting point of 130–133° C. were obtained.

Instead of titanium chloride or zirconium chloride the following metal compounds may be used: stannic chloride, thorium chloride, vanadium chloride, columbium chloride, tantalum chloride, chromic chloride, molybdenum chloride, tungsten chloride, uranium chloride, and ferric chloride.

What is claimed is:

1. A process for the catalytic polymerization of olefins having from 2–6 carbon atoms which comprises polymerizing said olefins in the presence of catalytic amounts of an etherate selected from the group of etherates consisting of trialkyl aluminum anisole etherate, trialkyl aluminum phenetole etherate, alkyl aluminum halide anisole etherate, alkyl aluminum halide phenetole etherate and mixtures of these etherates, and in the presence of a metal tetrachloride the metal of which belongs to group 4B of the periodic system.

2. In a process as claimed in claim 1, wherein said metal compound is selected from the group consisting of titanium tetrachloride and zirconium tetrachloride.

3. In a process as claimed in claim 1, wherein the polymerization is carried out at a temperature of between 0–200° C.

4. In a process as claimed in claim 1, wherein the polymerization is carried out at normal pressure.

5. In a process as claimed in claim 1, wherein the polymerization is carried out under a pressure of up to 500 atmospheres.

6. A process according to claim 1 wherein the polymerization is carried out at a temperature of between 20–100° C.

7. In a process as claimed in claim 1, wherein the polymerization is carried out in a solvent.

8. In a process as claimed in claim 2, wherein the solvent is a gasoline fraction.

9. In a process as claimed in claim 2, wherein the solvent is the same ether from which said etherate is obtained.

References Cited in the file of this patent

FOREIGN PATENTS 534,792    Belgium _____ Jan. 31, 1955

OTHER REFERENCES

Rochow et al.: The Chemistry of Organometallic Compounds (1957), John Wiley & Sons, New York, page 135.

UNITED STATES PATENT OFFICE
CERTIFICATION OF CORRECTION

Patent No. 2,956,992                      October 18, 1960

Gerhard Geiseler et al.

It is hereby certified that error appears in the above numbered patent requiring correction and that the said Letters Patent should read as corrected below.

Column 6, line 41, for the claim reference numeral "2" read -- 7 --; line 43, for the claim reference numeral "2" read -- 7 --.

Signed and sealed this 25th day of April 1961.

(SEAL)
Attest:

ERNEST W. SWIDER                             DAVID L. LADD
Attesting Officer                               Commissioner of Patents